United States Patent
Kim et al.

(10) Patent No.: US 12,472,857 B2
(45) Date of Patent: Nov. 18, 2025

(54) LEG REST APPARATUS FOR VEHICLE SEAT

(71) Applicant: Hyundai Transys Inc., Seosan-si (KR)

(72) Inventors: Jong Su Kim, Hwaseong-si (KR);
Kyeong Ju Kim, Hwaseong-si (KR);
Hwa Young Mun, Hwaseong-si (KR);
Gwon Hwa Bok, Hwaseong-si (KR);
Cheolhwan Yoon, Hwaseong-si (KR);
Jae Yong Jang, Hwaseong-si (KR);
Han Yun Choi, Hwaseong-si (KR);
Junsik Hwang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 174 days.

(21) Appl. No.: 18/490,440

(22) Filed: Oct. 19, 2023

(65) Prior Publication Data

US 2024/0166110 A1     May 23, 2024

(30) Foreign Application Priority Data

Nov. 17, 2022     (KR) .......................... 10-2022-0154637

(51) Int. Cl.
*B60N 2/90*     (2018.01)

(52) U.S. Cl.
CPC .................................. *B60N 2/995* (2018.02)

(58) Field of Classification Search
CPC ........ B60N 2/995; A47C 1/034; A47C 1/0342
See application file for complete search history.

(56) References Cited

U.S. PATENT DOCUMENTS

| | | | | |
|---|---|---|---|---|
| 7,866,755 B2 * | 1/2011 | Okano | ................... | B60N 2/995 |
| | | | | 297/423.26 |
| 9,821,692 B2 * | 11/2017 | Vyskocil | ............ | B60N 2/42763 |
| 10,232,756 B2 * | 3/2019 | Kim | ....................... | B60N 2/995 |
| 2017/0318971 A1 * | 11/2017 | Kim | ...................... | A47C 7/5068 |
| 2018/0338620 A1 * | 11/2018 | Katori | ................ | B60N 2/02246 |
| 2022/0048422 A1 * | 2/2022 | Kim | ........................ | B60N 3/063 |

FOREIGN PATENT DOCUMENTS

| | | | | | |
|---|---|---|---|---|---|
| CN | 102874145 B | * | 4/2015 | | |
| CN | 109228987 A | * | 1/2019 | ............ | B60N 2/995 |
| CN | 209141972 U | * | 7/2019 | | |
| JP | H11332688 A | * | 12/1999 | | |
| JP | 2009011546 A | * | 1/2009 | | |
| JP | 2010148775 A | * | 7/2010 | | |
| JP | 2017-001419 A | | 1/2017 | | |
| JP | 2017202818 A | * | 11/2017 | ............ | B60N 2/995 |
| KR | 10-1725414 B1 | | 4/2017 | | |
| KR | 101825909 B1 | * | 2/2018 | ............ | B60N 2/995 |
| KR | 10-2021-0051705 A | | 5/2021 | | |
| KR | 10-2022-0020557 A | | 2/2022 | | |
| KR | 20220055753 A | * | 5/2022 | ............ | B60N 2/995 |

\* cited by examiner

*Primary Examiner* — Joshua J Michener
(74) *Attorney, Agent, or Firm* — Bridgeway IP Law Group, PLLC; Jihun Kim

(57) ABSTRACT

A leg rest apparatus includes a base bracket mounted below a seat cushion of a vehicle seat, a rear link coupled to a lateral portion of the base bracket, a front link coupled to the lateral portion of the base bracket and positioned above the rear link, a main link hingedly coupled to one end of the rear link and a middle portion of the front link, a support link coupled to one end of the front link, and a leg rest link coupled to the main link and one end of the support link.

11 Claims, 6 Drawing Sheets

LEG REST APPARATUS FOR VEHICLE SEAT

CROSS-REFERENCE TO RELATED APPLICATIONS

This application claims priority to and the benefit of Korean Patent Application No. 10-2022-0154637 filed in the Korean Intellectual Property Office on Nov. 17, 2022, the entire contents of which are incorporated herein by reference.

TECHNICAL FIELD

The present invention relates to a leg rest apparatus for a vehicle seat, and more particularly, to a leg rest apparatus for a vehicle seat, which has a reduced size and weight.

BACKGROUND ART

A vehicle seat includes a seatback configured to support an upper body of a seated passenger, a headrest configured to support the passenger's head, and a seat cushion configured to support the passenger's lower body.

A general vehicle seat is equipped with no separate apparatus capable of supporting the passenger's leg, which makes the passenger uncomfortable when traveling a long distance by using a vehicle.

In order to solve the problem, there is a technology that provides a leg rest disposed at a front portion of a seat cushion and configured to support the passenger's leg, thereby improving the ride quality and convenience.

When the passenger does not use the leg rest, the leg rest stands vertically at a front portion of the seat cushion and is in close contact with the seat cushion or positioned under the seat cushion in a hidden state. When the passenger intends to use the leg rest, the leg rest is extended forward from the seat cushion and rotated upward at a predetermined angle.

Meanwhile, in order to protect the passenger, it is necessary to mount a protective cover on a lateral side of the leg rest so that driving elements of the leg rest are not exposed. An area of the lateral side of the leg rest, which is covered by the protective cover, and an overall weight of the leg rest are determined depending on the arrangement and operating state of the driving elements of the leg rest. In consideration of the manufacturing costs and the weight to be added to the vehicle, it is necessary to reduce the number of components, size, or weight of the leg rest.

SUMMARY OF THE INVENTION

The present invention has been made in an effort to provide a leg rest apparatus for a vehicle seat, which has a reduced size and weight.

The present invention provides a leg rest apparatus for a vehicle seat, the leg rest apparatus including: a base bracket mounted below a seat cushion of a vehicle seat; a rear link coupled to a lateral portion of the base bracket; a front link coupled to the lateral portion of the base bracket and positioned above the rear link; a main link hingedly coupled to one end of the rear link and a middle portion of the front link; a support link coupled to one end of the front link; and a leg rest link coupled to the main link and one end of the support link, in which a pair of rear links, a pair of front links, a pair of main links, a pair of support links, and a pair of leg rest links are each disposed to face each other in a width direction of the base bracket, and in which the leg rest apparatus may further include: a main pipe coupled to the pair of main links while traversing the pair of main links; an auxiliary pipe coupled to the pair of leg rest links while facing the main pipe and traversing the pair of leg rest links; and a motor assembly coupled to the main pipe and connected to the auxiliary pipe.

In the embodiment, the leg rest apparatus may further include: a leg rest frame coupled to a front surface of the leg rest link and configured to support a leg rest cushion.

In the embodiment, one side of the rear link may be rotatably coupled to a lower end of the lateral portion of the base bracket by means of a first hinge part, and the other side of the rear link may be rotatably coupled to one side of the main link by means of a second hinge part.

One side of the front link may be rotatably coupled to the lateral portion of the base bracket by means of a third hinge part, the other side of the front link may be rotatably coupled to one side of the support link by means of a fifth hinge part, a fourth hinge part may be provided between the third hinge part and the fifth hinge part, and the other side of the front link and a middle portion of the main link may be rotatably coupled by means of a fourth hinge part.

The other side of the main link may be rotatably coupled to one side of the leg rest link by means of a sixth hinge part.

The auxiliary pipe may be coupled to the other side of the leg rest link, and a middle portion of the leg rest link may be rotatably coupled to the other side of the support link by means of a seventh hinge part.

In the embodiment, the motor assembly may include: a gearbox coupled to the main pipe; a drive motor coupled to the gearbox and configured to transmit driving power; and a lead screw connected to the gearbox and having a length that is adjusted by an operation of the drive motor.

The gearbox may be coupled to a motor assembly mounting part provided on the main pipe.

An operation arm may be provided on the auxiliary pipe, a driving rod may be provided at an end of the lead screw and coupled to the operation arm, and the driving rod may rotate the auxiliary pipe as the length of the lead screw is adjusted.

According to the present invention, the weight of the leg rest apparatus for a vehicle seat and the number of components may be minimized, which enables an efficient operation.

According to the present invention, it is possible to reduce a size of a cover for covering the operating members of the leg rest apparatus in a transverse direction.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
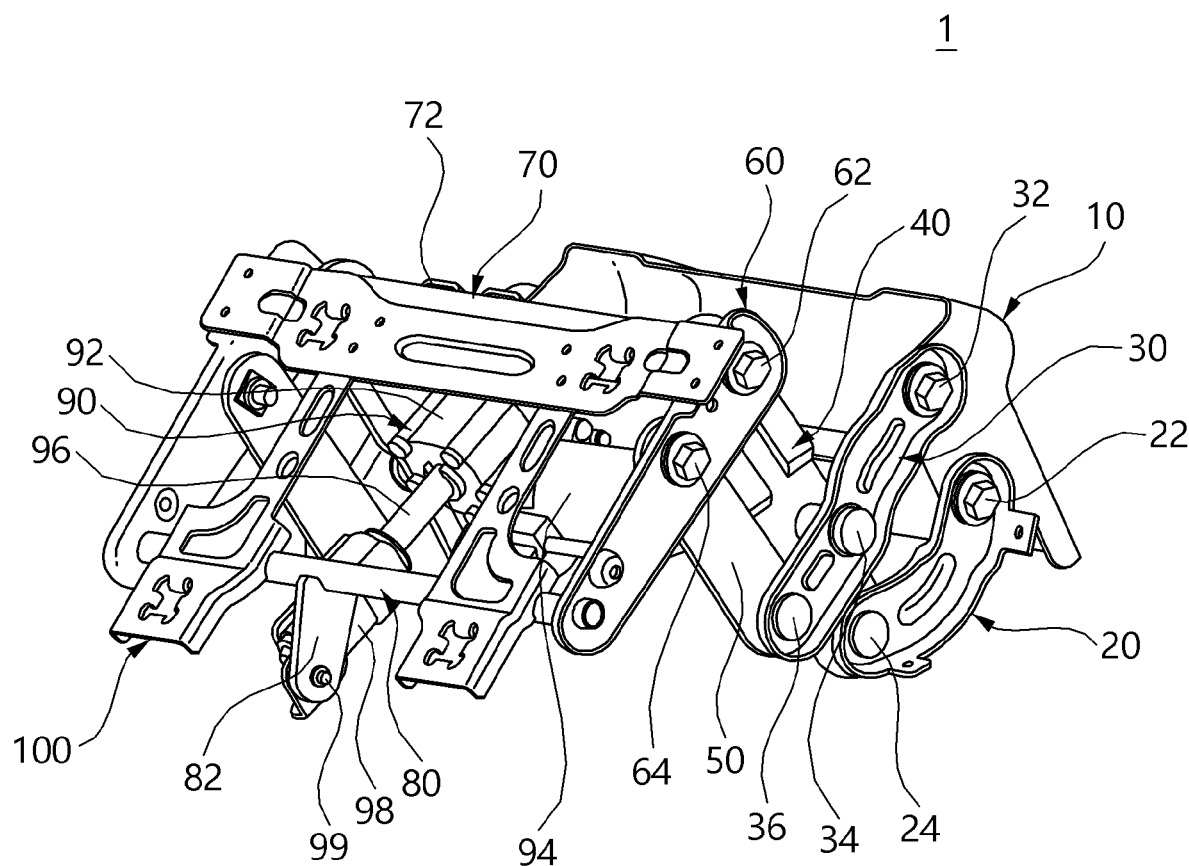
FIG. 1 is a perspective view of a leg rest apparatus for a vehicle seat according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
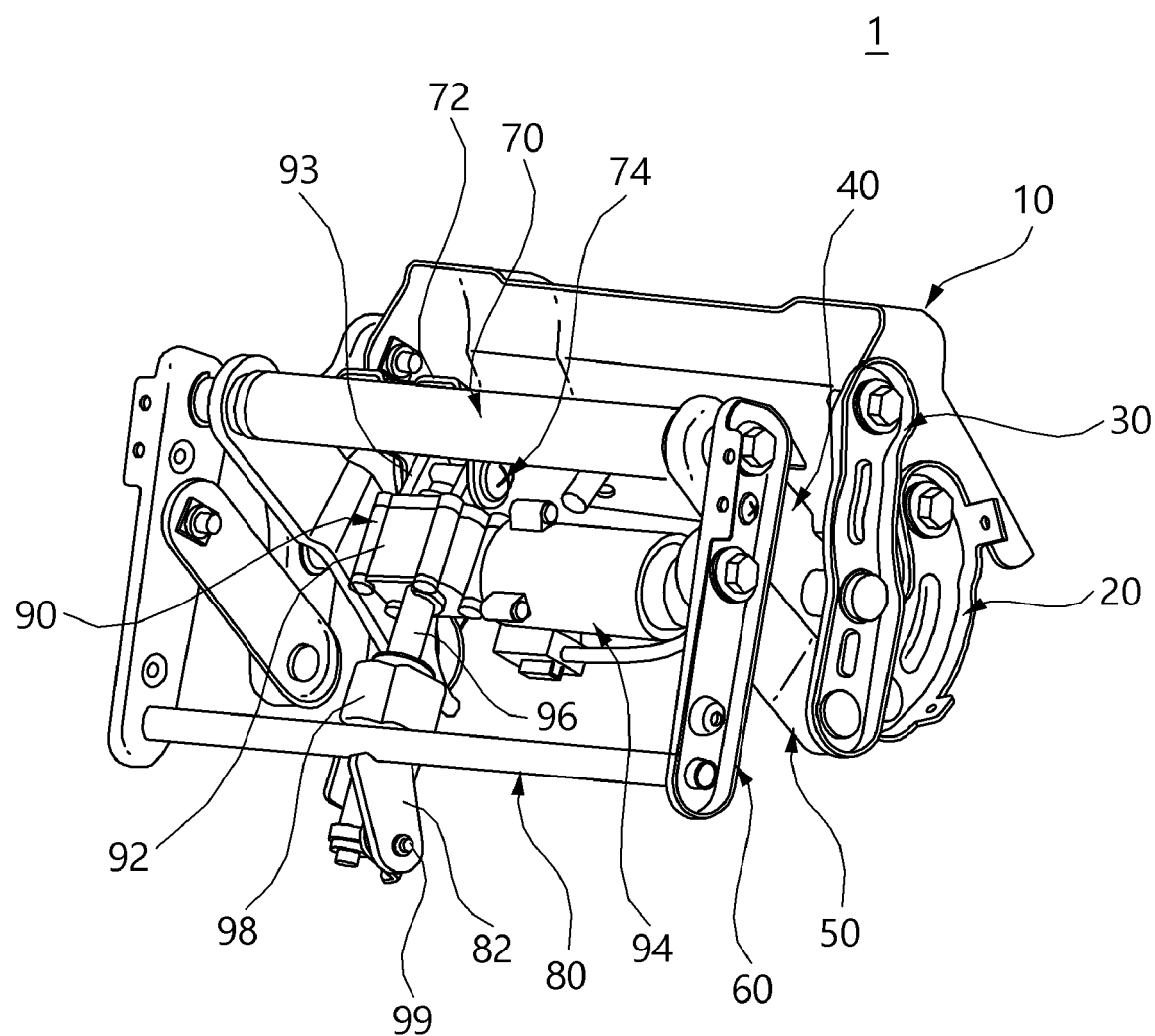
FIG. 2 is a front perspective view illustrating a state in which a frame part is removed from the leg rest apparatus for a vehicle seat according to the embodiment of the present invention.
Figure 3:
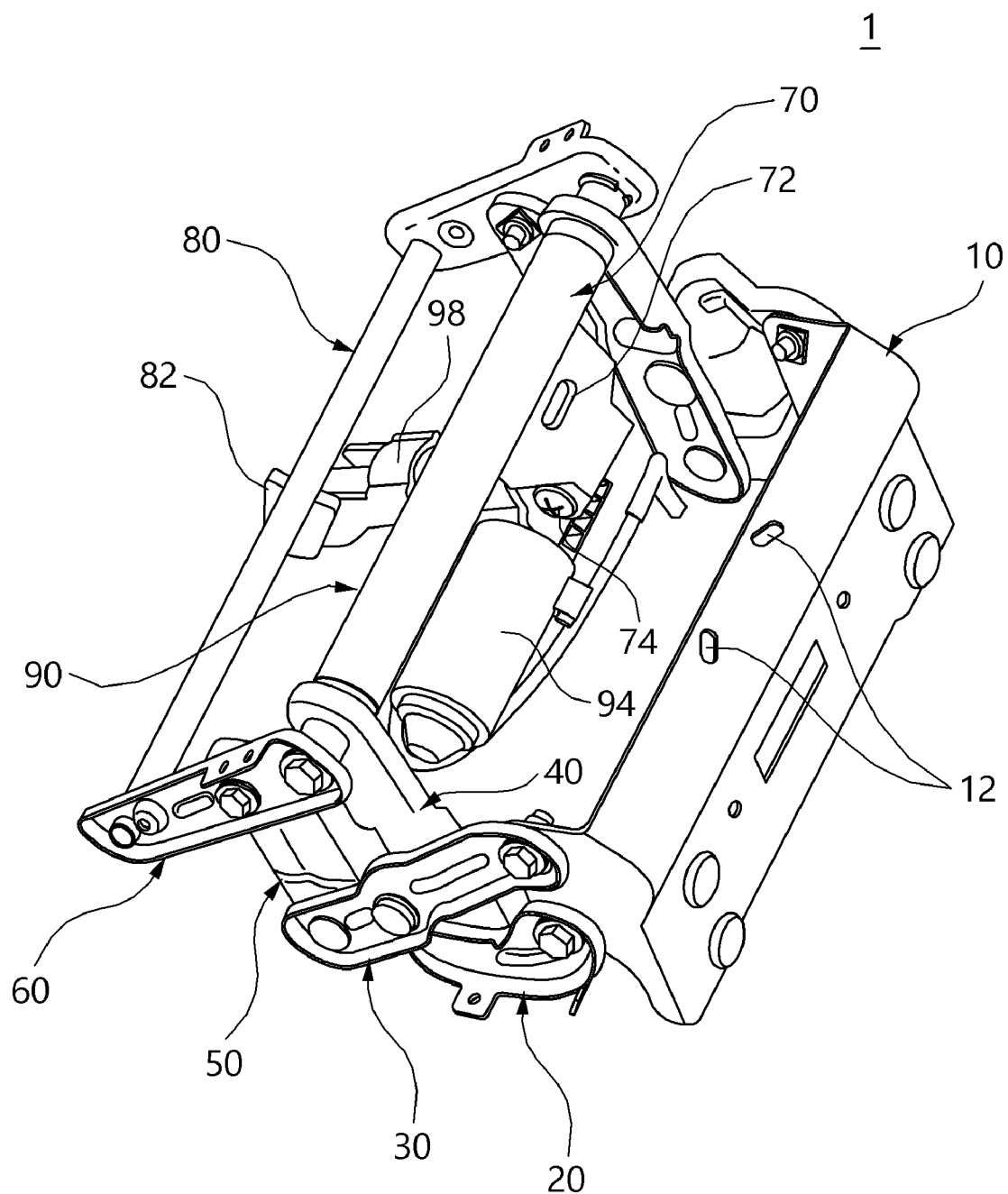
FIG. 3 is a rear perspective view illustrating a state in which the frame part is removed from the leg rest apparatus for a vehicle seat according to the embodiment of the present invention.

FIG. 1 is a perspective view of a leg rest apparatus for a vehicle seat according to an embodiment of the present invention. FIG. 2 is a front perspective view illustrating a state in which a frame part is removed from the leg rest apparatus for a vehicle seat according to the embodiment of the present invention, and FIG. 3 is a rear perspective view illustrating a state in which the frame part is removed from the leg rest apparatus for a vehicle seat according to the embodiment of the present invention.

A leg rest apparatus 1 for a vehicle seat according to an embodiment of the present invention includes a base bracket 10 mounted below a seat cushion of a vehicle seat, rear and front links 20 and 30 disposed at lateral sides of the base bracket 10 at an interval, main links 40 each hingedly coupled to one end of each of the rear links 20 and a middle portion of each of the front link 30, support links 50 each coupled to one end of each of the front links 30, leg rest links 60 each coupled to one end of each of the main links 40 and one end of each of the support links 50, a main pipe 70 coupled to the pair of the main links 40 while traversing the pair of the main links 40, an auxiliary pipe 80 coupled to the pair of the leg rest links 60 while facing the main pipe 70 and traversing the pair of the leg rest links 60, and a motor assembly 90 coupled to the main pipe 70 and connected to the auxiliary pipe 80.

A leg rest frame 100 for supporting a leg rest cushion may be provided on front surfaces of the leg rest links 60 or between the leg rest links 60 and provided on a front surface of the main pipe 70 and a front surface of the auxiliary pipe 80.

The pair of rear links 20, the pair of front links 30, the pair of main links 40, the pair of support links 50, and the pair of leg rest links 60 may each be provided to face each other with the base bracket 10 interposed therebetween in a width direction.

The base bracket 10 is a member for coupling the leg rest apparatus 1 for a vehicle seat to a lower portion of the seat cushion of the vehicle seat. The leg rest apparatus 1 for a vehicle seat serves as a base member. In the embodiment, as illustrated in FIG. 3, the base bracket 10 may have coupling holes 12 for fastening members such as coupling screws at the time of coupling the base bracket 10 to the seat cushion of the vehicle seat.

The rear link 20 is coupled to a lower end of a lateral portion of the base bracket 10, and the front link 30 is coupled to the lateral portion of the base bracket 10 and positioned above the rear link 20.

One side of the rear link 20 is rotatably coupled to the lower end of the lateral portion of the base bracket 10 by means of a first hinge part 22. In addition, the other side of the rear link 20 is rotatably coupled to one side of the main link 40 by means of a second hinge part 24.

One side of the front link 30 is rotatably coupled to the lateral portion of the base bracket 10 by means of a third hinge part 32 and positioned above the rear link 20. The other side of the front link 30 is rotatably coupled to one side of the support link 50 by means of a fifth hinge part 36. Meanwhile, a fourth hinge part 34 is provided between the third hinge part 32 and the fifth hinge part 36, and the front link 30 and the main link 40 are rotatably coupled by means of the fourth hinge part 34.

One side of the main link 40 is coupled to the rear link 20 by means of the second hinge part 24 and coupled to the front link 30 by means of the fourth hinge part 34. The other side of the main link 40 is rotatably coupled to the leg rest link 60 by means of a sixth hinge part 62.

One side of the support link 50 is rotatably coupled to the front link 30 by means of the fifth hinge part 36. The other side of the support link 50 is rotatably coupled to the leg rest link 60 by means of a seventh hinge part 64.

One side of the leg rest link 60 is coupled to the main link 40 by means of the sixth hinge part 62, and the middle portion of the leg rest link 60 is coupled to the support link 50 by means of the seventh hinge part 64 and extends from the sixth hinge part 62 beyond the seventh hinge part 64. The auxiliary pipe 80 is rotatably coupled to the other side of the leg rest link 60.

As illustrated in FIGS. 1 to 3, the main link 40 and the support link 50 may be positioned inward from the rear link 20, the front link 30, and the leg rest link 60 based on the width direction of the base bracket 10.

The main pipe 70 is coupled to the pair of main links 40 while traversing the pair of main links 40. In the embodiment, the main pipe 70 may be coupled to the sixth hinge part 62.

The motor assembly 90 may include a gearbox 92, a drive motor 94, and a lead screw 96. The length of the lead screw 96 may be increased or decreased from the gearbox 92 by a rotation of the drive motor 94. The gearbox 92 may transmit rotational driving power of the drive motor 94 to the lead screw 96 to adjust the length of the lead screw 96. In the embodiment, the drive motor 94 may be coupled to one side of the gearbox 92 in a direction approximately perpendicular to the lead screw 96.

In the present invention, the motor assembly 90 may be provided between the main pipe 70 and the auxiliary pipe 80.

The main pipe 70 has a motor assembly mounting part 72. The motor assembly mounting part 72 may be fixed to the main pipe 70 by welding. The motor assembly mounting part 72 has a motor assembly fixing member 74 for coupling the motor assembly 90.

In the embodiment, the gearbox 92 of the motor assembly 90 may be coupled to the motor assembly mounting part 72 by means of the motor assembly fixing member 74. The gearbox 92 may have a mounting protrusion 93 coupled to the motor assembly mounting part 72. The motor assembly fixing member 74 is inserted into and penetrate the motor assembly mounting part 72 and the mounting protrusion 93, such that the motor assembly 90 is coupled to the motor assembly mounting part 72.

In the embodiment, a connection bracket 98 is mounted at one side of the lead screw 96, and a driving rod 99 is provided on the connection bracket 98 and protrudes in a length direction of the auxiliary pipe 80. The driving rod 99 is rotatably inserted into an operation arm 82 fixed to the auxiliary pipe 80. The operation arm 82 is a member fixed and coupled in a direction approximately perpendicular to the length direction of the auxiliary pipe 80.

When the length of the lead screw 96 is increased by the rotation of the drive motor 94, the leg rest link 60 rotates clockwise when viewed based on the seventh hinge part 64. Therefore, the main link 40, the support link 50, the rear link 20, and the front link 30, which are directly or indirectly connected to the leg rest link 60, are operated, such that the leg rest apparatus 1 is unfolded. Thereafter, when the length of the lead screw 96 is decreased by the rotation of the drive motor 94, the leg rest link 60 rotates counterclockwise when viewed based on the seventh hinge part 64. Therefore, the main link 40, the support link 50, the rear link 20, and the front link 30, which are directly or indirectly connected to the leg rest link 60, are operated, such that the leg rest apparatus 1 is folded.

An operating process of the leg rest apparatus 1 will be described with reference to the drawings.

Figure 4:
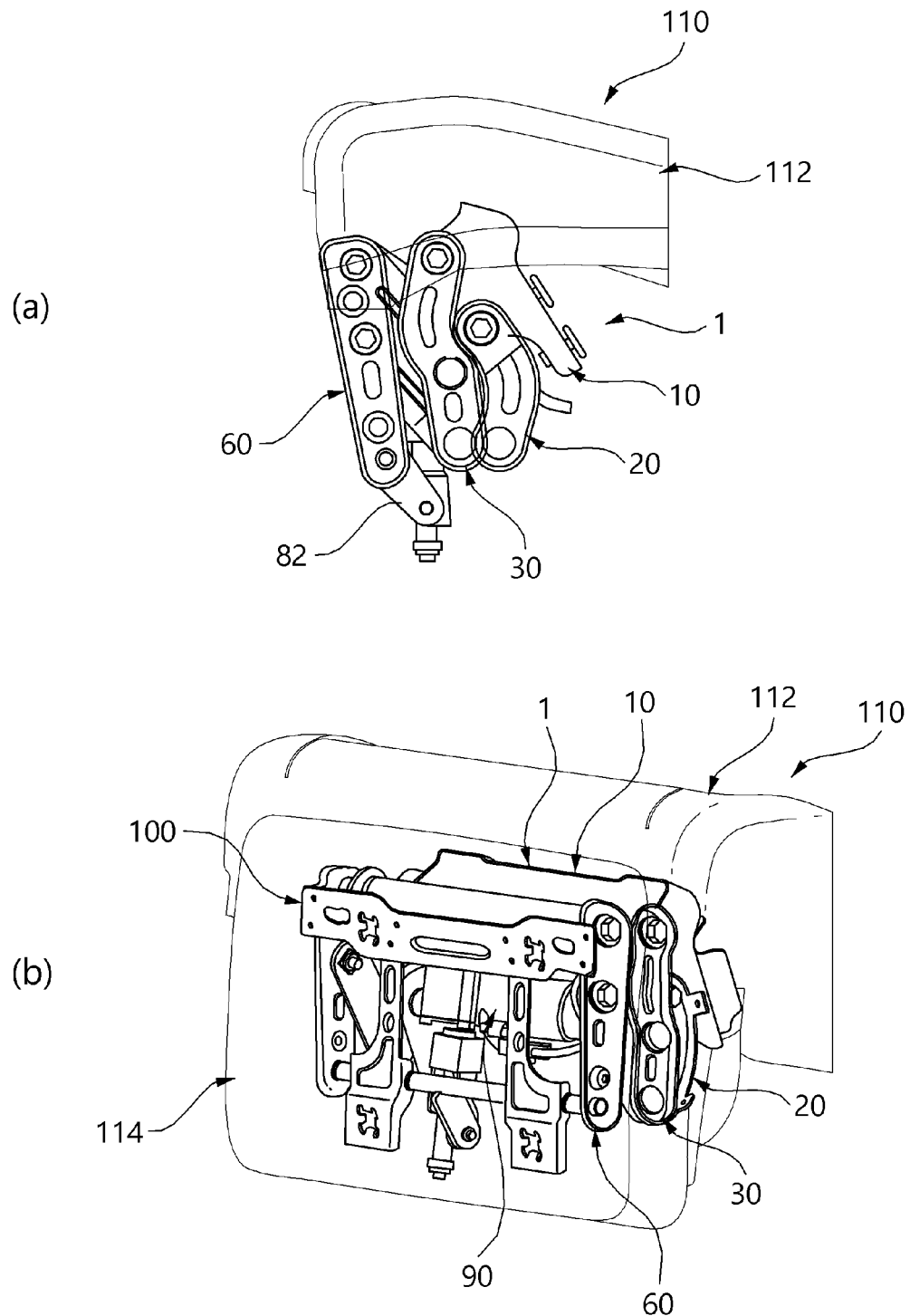
FIG. 4 is a view illustrating a state in which the leg rest apparatus for a vehicle seat according to the embodiment of the present invention is folded.
Figure 5:
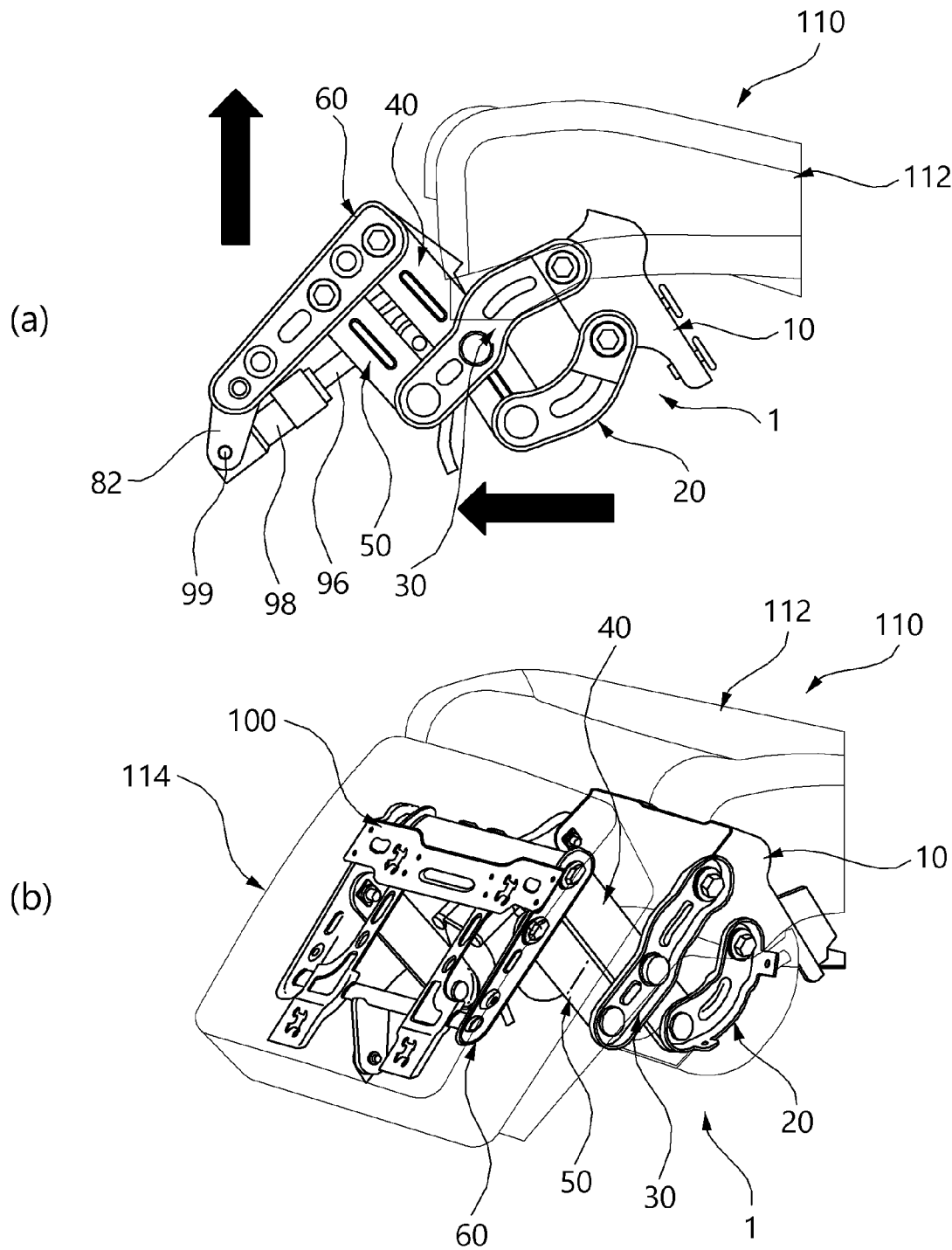
FIG. 5 is a view illustrating a state in which the leg rest apparatus for a vehicle seat according to the embodiment of the present invention is being unfolded.
Figure 6:
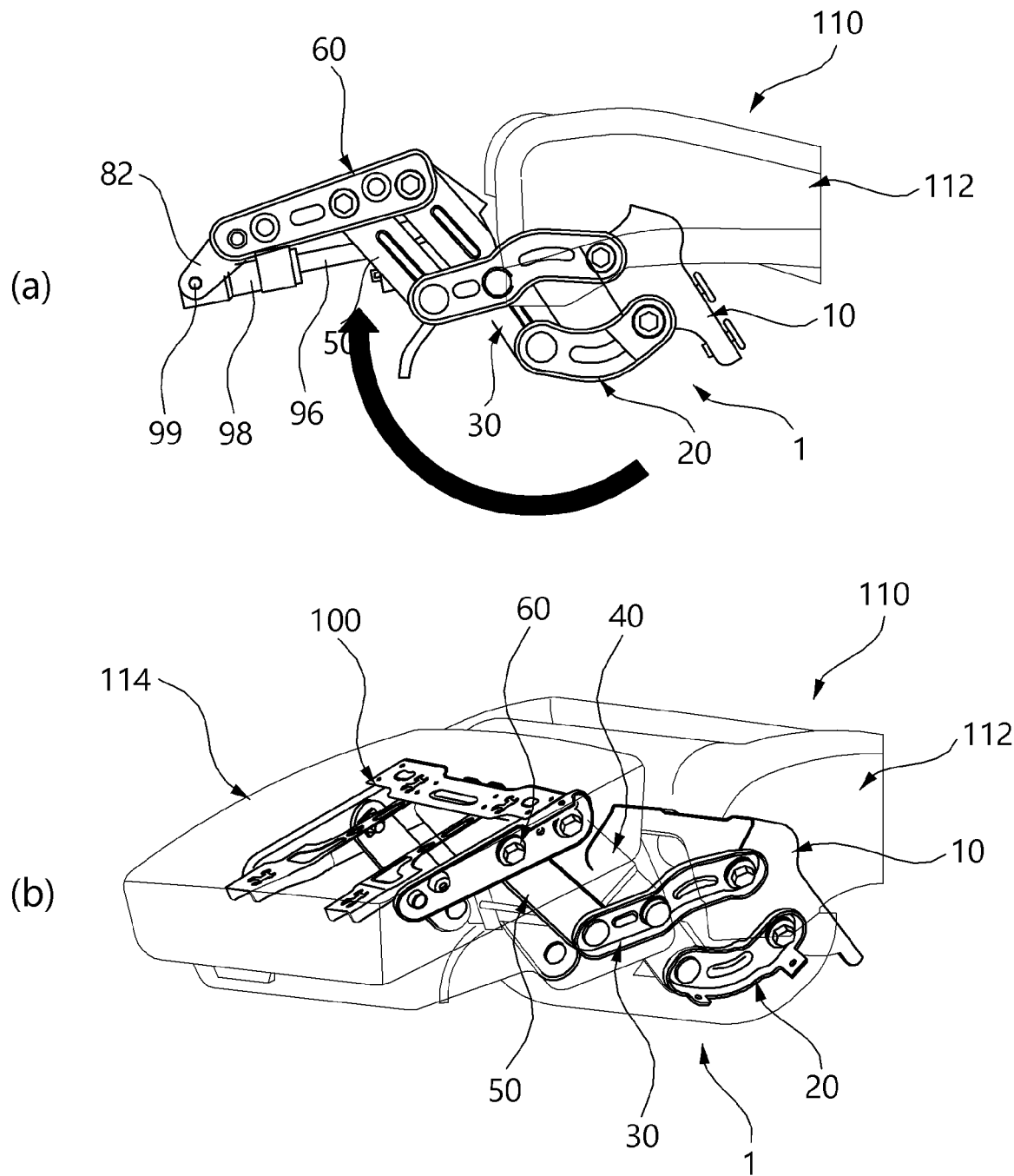
FIG. 6 is a view illustrating a state in which the leg rest apparatus for a vehicle seat according to the embodiment of the present invention is unfolded.

FIG. 4 is a view illustrating a state in which the leg rest apparatus for a vehicle seat according to the embodiment of the present invention is folded, FIG. 5 is a view illustrating a state in which the leg rest apparatus for a vehicle seat according to the embodiment of the present invention is being unfolded, and FIG. 6 is a view illustrating a state in which the leg rest apparatus for a vehicle seat according to the embodiment of the present invention is unfolded. Part (a) of FIG. 4, part (a) of FIG. 5, and part (a) of FIG. 6 are side views illustrating states in which a leg rest cushion 114 is removed, and part (b) of FIG. 4, part (b) of FIG. 5, and part (b) of FIG. 6 are perspective views illustrating states in which the leg rest cushion 114 is mounted.

With reference to FIG. 4, the leg rest apparatus 1 is mounted below a seat cushion 112 of a vehicle seat 110, and the leg rest cushion 114 is coupled to the leg rest frame 100 of the leg rest apparatus 1. In FIG. 4, the lead screw 96 of the motor assembly 90 is in a minimum length state, the rear link 20, the front link 30, and the leg rest link 60 are in folded states, and the leg rest cushion 114 is positioned approximately perpendicularly downward.

With reference to FIG. 5, when driving power of the drive motor 94 of the motor assembly 90 is transmitted to the lead screw 96 through the gearbox 92, the length of the lead screw 96 increases, and the leg rest link 60 rotates clockwise. Therefore, the leg rest link 60 moves upward while being unfolded. The front link 30 and the rear link 20 connected to the leg rest link 60 through the main link 40 and the support link 50 are unfolded from the base bracket 10.

With reference to FIG. 6, in a state in which the leg rest link 60 is rotated maximally, the leg rest cushion 114 moves upward to a height approximately similar to a height of the seat cushion 112.

The position of the leg rest cushion 114 may be adjusted between the states illustrated in FIGS. 4 and 6 by adjusting the length of the lead screw 96. When the length of the lead screw 96 is decreased in the state in FIG. 6, the state may return to the state in FIG. 4 via the state in FIG. 5.

According to the present invention, the weight of the leg rest apparatus 1 and the number of components may be minimized, which enables an efficient operation. In addition, with reference to FIGS. 4 to 6, the motor assembly 90 configured to operate the leg rest apparatus 1 is not visible from the lateral side by being covered by the rear link 20, the front link 30, the main link 40, the support link 50, and the like because of a mounting position thereof. Therefore, it is possible to reduce a size of a cover for covering the operating members including the above-mentioned links of the leg rest apparatus 1 in a transverse direction.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A leg rest apparatus for a vehicle seat, the leg rest apparatus comprising:
  a base bracket configured to be mounted below a seat cushion of a vehicle seat;

a pair of rear links coupled to a lateral portions of the base bracket, respectively, the pair of rear links facing each other in a width direction of the base bracket;

a pair of front links coupled to the lateral portions of the base bracket, respectively, and positioned above the pair of rear links, respectively, the pair of front links facing each other in the width direction of the base bracket;

a pair of main links, each being hingedly coupled to one end of each of the pair of rear links and a middle portion of each of the pair of front links, the pair of main links facing each other in the width direction of the base bracket;

a pair of support links, each being coupled to one end of each of the pair of front links, the pair of support links facing each other in the width direction of the base bracket;

a pair of leg rest links coupled to the pair of main links, respectively, each of the pair of leg rest links being coupled to one end of each of the pair of support links, the pair of leg rest links facing each other in the width direction of the base bracket;

a main pipe coupled to the pair of main links while traversing the pair of main links;

an auxiliary pipe coupled to the pair of leg rest links while being disposed apart from and parallel to the main pipe and traversing the pair of leg rest links; and a motor assembly coupled to the main pipe and connected to the auxiliary pipe.

2. The leg rest apparatus of claim 1, further comprising:
a leg rest frame coupled to a front surface of each of the pair of leg rest links and configured to support a leg rest cushion.

3. The leg rest apparatus of claim 1, wherein a first side of each of the pair of rear links is rotatably coupled to a lower end of each of the lateral portions of the base bracket by a first hinge part, and a second side of each of the pair of rear links is rotatably coupled to a first side of each of the pair of main links by a second hinge part.

4. The leg rest apparatus of claim 3, wherein a first side of each of the pair of front links is rotatably coupled to each of the lateral portions of the base bracket by a third hinge part, a second side of each of the pair of front links is rotatably coupled to a first side of each of the pair of support links by a fifth hinge part, a fourth hinge part is disposed between the third hinge part and the fifth hinge part, and the second side of each of the pair of front links and a middle portion of each of the pair of main links are rotatably coupled to each other by means of the fourth hinge part.

5. The leg rest apparatus of claim 4, wherein a second side of each of the pair of main links is rotatably coupled to a first side of each of the pair of leg rest links by a sixth hinge part.

6. The leg rest apparatus of claim 5, wherein the auxiliary pipe is coupled to a second side of each of the pair of leg rest links, and a middle portion of each of the pair of leg rest links is rotatably coupled to a second side of each of the pair of support links by a seventh hinge part.

7. The leg rest apparatus of claim 5, wherein the main pipe is coupled to the pair of main links between the sixth hinge part.

8. The leg rest apparatus of claim 1, wherein each of the pair of leg rest links is configured to be rotated about a portion connected to each of the pair of support link links by an operation of the motor assembly.

9. The leg rest apparatus of claim 1, wherein the motor assembly comprises:
a gearbox coupled to the main pipe;
a drive motor coupled to the gearbox and configured to transmit driving power; and
a lead screw connected to the gearbox and configured to adjust a length of the lead screw by an operation of the drive motor.

10. The leg rest apparatus of claim 9, wherein the gearbox is coupled to a motor assembly mounting part disposed on the main pipe.

11. The leg rest apparatus of claim 9, wherein an operation arm is disposed on the auxiliary pipe, a driving rod is disposed at an end of the lead screw and coupled to the operation arm, and the driving rod is configured to rotate the auxiliary pipe as the length of the lead screw is adjusted.

* * * * *